United States Patent [19]
Cardullo et al.

[11] 3,713,148
[45] Jan. 23, 1973

[54] TRANSPONDER APPARATUS AND SYSTEM

[75] Inventors: Mario W. Cardullo, Rockville; William L. Parks, III, Bethesda, both of Md.

[73] Assignee: Communications Services Corporation, Inc., Rockville, Md.

[22] Filed: May 21, 1970

[21] Appl. No.: 39,309

[52] U.S. Cl. .............................. 343/6.5 R, 343/6.8 R
[51] Int. Cl. ................................................. G01s 9/56
[58] Field of Search .......... 343/6.5 R, 6.5 LC, 6.5 SS, 343/6.8 R, 6.8 LC

[56] References Cited

UNITED STATES PATENTS 3,541,257    11/1970    McCormick et al.........343/6.5 LC X
3,144,645    8/1964     McIver et al...................343/6.5 R X Primary Examiner—T. H. Tubbesing
Attorney—Jacobi, Lilling & Siegel

[57] ABSTRACT

A novel transponder apparatus and system is disclosed, the system being of the general type wherein a base station transmits an "interrogation" signal to a remote transponder, the transponder responding with an "answerback" transmission. The transponder includes a changeable or writable memory, and means responsive to the transmitted interrogation signal for processing the signal and for selectively writing data into or reading data out from the memory. The transponder then transmits an answerback signal from the data read-out from its internal memory, which signal may be interpreted at the base station. In the preferred inventive embodiment, the transponder generates its own operating power from the transmitted interrogation signal, such that the transponder apparatus is self-contained.

7 Claims, 3 Drawing Figures

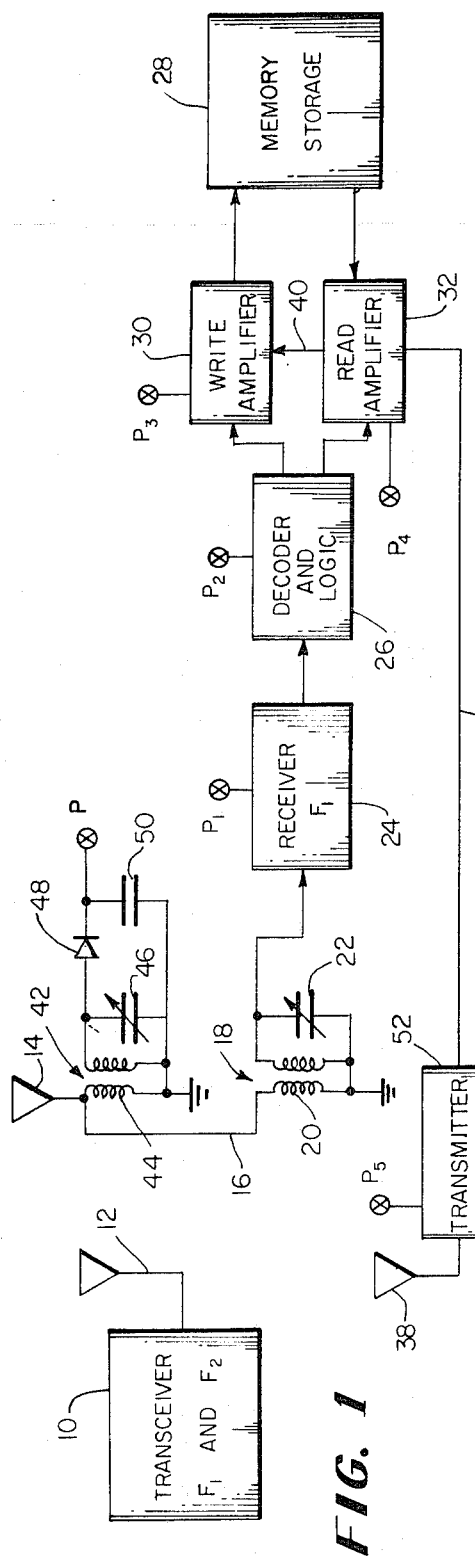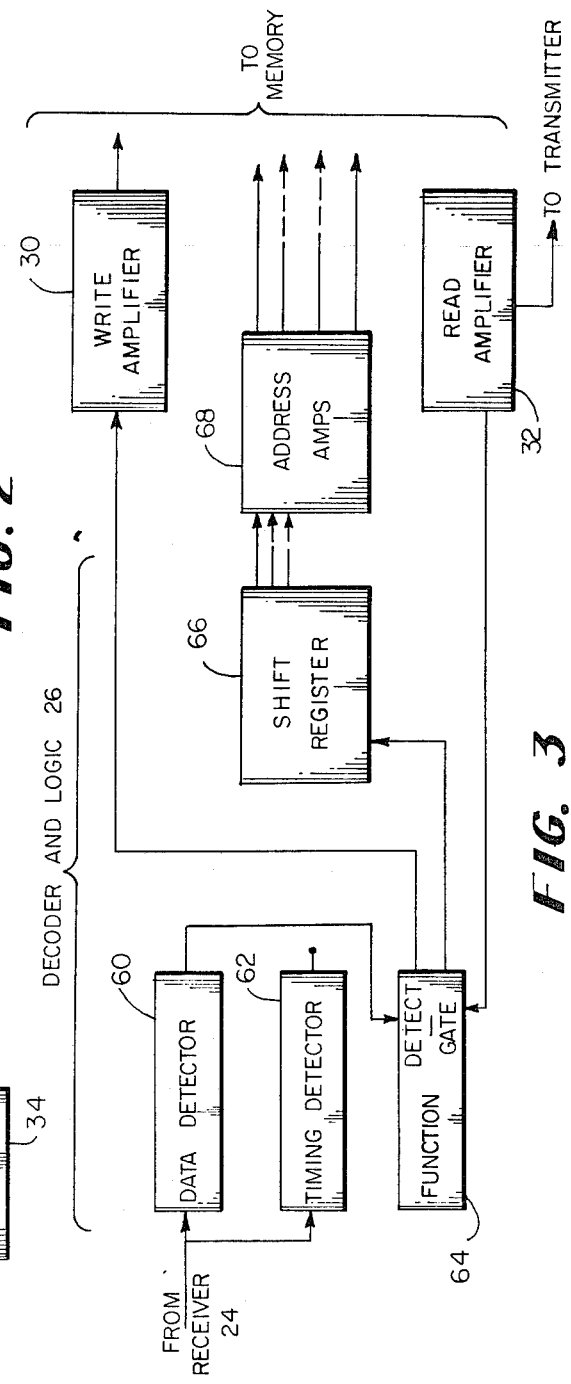

TRANSPONDER APPARATUS AND SYSTEM

BACKGROUND OF THE INVENTION

This invention generally relates to communication apparatus and specifically concerns a transponder apparatus and system.

The transponder devices and apparatus for utilization in interrogation systems are, per se, known to the art and have found application in general verification environments. Such systems are particularly suitable with vehicular identification as well as general communication techniques.

The basic operation of an interrogation-transponder system of the type to which this invention relates is known and contemplates the provision of a base station which transmits an interrogation signal to a transponder device disposed at some location spaced therefrom yet in sufficiently close proximity to the base station to permit communication of signals therebetween. Depending upon the construction and internal coding or format of the transponder device, same will respond to the interrogation signal and provide a suitable form of answerback signal to the base station, which answerback signal contains information relative to identification, verification, and the like.

Consistent with these general operating principles, interrogation systems have, for example, been widely utilized to identify moving vehicles such as railroad cars. In this instance, a base station would be disposed along the side of a railroad track and individual transponder devices would be disposed on each of the railroad cars. As the railroad cars pass in close proximity to the base station, an interrogation signal sent from the base station to the transponders on the individual cars would cause the individual transponders to provide an answerback signal, this signal being coded or the like in such a manner that information peculiar to the passing railroad car can be obtained. One known system of this general type utilizes, as the transponder device, a series of reflective surfaces, such as color-coded markings, disposed on the side of the passing car and the base station would transmit an optical signal comprising a light beam, for example, which signal would be reflected in accordance with a particular coding associated with the individual car reflective surfaces. In dependence upon the varying intensity and other characteristics of the reflected optical signal, the base station would be able to identify the passing car.

Other typical interrogation-transponder systems utilize acoustic energy as the interrogation and answerback signal while still others utilize radio frequency energy. In this latter instance, the interrogation signal transmitted by the base station would comprise a coded modulated carrier which would be intercepted by the transponder and cause the transponder to retransmit an answerback radio frequency signal in accordance with a stored code within the transponder device. A highly disadvantageous limitation of this type of an interrogation system concerns the fact that the transponder device normally is not passive in that it must contain its own power supply, which power supply upon depletion of its energy renders the device useless.

Many other applications of interrogation-transponder systems are known and will be recognized, such systems utilizing various forms of energy as interrogation and answerback signals and, as should be appreciated, the possibilities with respect to utilization of systems of this type are quite broad in scope. However, known interrogation-transponder systems presently in operation are not at all as versatile as they might be. Almost invariably, these transponder devices are provided with a preset and non-changeable internal coding or logic format enabling the transponder device to respond to but a single signal and limiting the potential usefulness of the device in other environments. Thus, in the case of the railroad car identification system briefly discussed above, the reflective surfaces placed on the side of a passing car of the train function to identify one and only one railroad car and the answerback signal emanating from the transponder device comprising these reflective surfaces is set in the sense that same cannot readily be changed. Even those interrogation-transponder systems utilizing radio-frequency transmitted signals, suffer the same disadvantage, as the internal circuitry of the transponder device responds to a given interrogation signal only and will re-transmit only a given answerback signal for identification. Additionally, as described, those systems operating with radio frequency power have, in the past, been required to contain their own energy supply which limits the useful life thereof.

SUMMARY OF THE INVENTION

Now, it should be apparent that the versatility of such interrogation-transponder systems could be greatly increased if a transponder device were to be constructed which had a changeable internal memory or logic structure and format such that the transponder device could respond to any one of a number of different interrogation signals to provide various answerback signals and, more importantly, such that the interrogation signal itself could actually preset the internal code or logic of the transponder at will. It is at this point that the instant invention comes to being as it is a primary object of the instant invention to provide an interrogation system including a transponder device therefor which will perform this highly desirable function.

A further object of the novel invention concerns the provision of a transponder device of the type above-described, which transponder device is entirely passive in that it requires no internal source of operating power. In this fashion, the useful life of the transponder device would be greatly extended over that which presently is the case in the art.

Still another important object of the instant invention is to provide such a transponder device which is physically small in size such that the device is truly portable, can easily be hidden, if desired, and can be carried and placed in or upon many different objects.

It is yet another object of the instant invention to provide such a transponder device which is highly economical with respect to its production and maintenance costs, thereby enabling a wide spectrum of the general public to readily utilize the same and enabling the device's introduction into a number of different industries.

It is still a further object of the instant invention to provide an interrogation-transponder system which is accurate and reliable under all environmental conditions and which has data information capability of sufficient capacity to handle a wide variety of different codes.

These and still other objects of the instant invention which will become apparent as the description proceeds, are implemented herein by the provision of a novel interrogation-transponder system which, at its heart, comprises a transponder device of entirely novel construction and capability.

The transponder device according to this invention is contemplated for use in an interrogation system in which initially a base station means is provided, the base station means preferably comprising a transceiving device coupled with a computer, for example, for transmitting a coded interrogation signal to the transponder device and for receiving from the transponder device an answerback signal and processing the same in accordance with any desired technique. The transponder device is contemplated to be interrogated by the base station means when in relatively close proximity thereto and, upon interrogation, the transponder device processes the interrogation signal so as to decode the same and, in accordance with pre-selected logic therein, formulates and transmits an answerback signal to the base station means. Such an answerback signal can take the form of an identification signal indicative of a particular transponder means or, alternatively, the answerback signal could be such that it would only be generated in response to a predetermined interrogation code wherein the device would operate as a verification system.

Importantly, the transponder device of the instant invention incorporates therein a changeable memory storage means wherein, in response to a predetermined interrogation signal code, data information can be written into the memory as well as read out therefrom. This feature of the transponder device distinguishes the instant inventive apparatus from anything heretofore available in the prior art.

For example, if the instant inventive interrogation system is to be utilized in conjunction with an automatic automotive vehicle highway toll system, a transponder would be provided on the vehicle and a selected number corresponding to pre-paid tolls would be written into the changeable memory thereof. Now, as the vehicle passed the toll station evidenced by the provision of a base station transceiver, the interrogation signal emanating therefrom would be coded such that the transponder device on the vehicle would count-out the proper dollar amount of the toll to be paid and would subtract this amount from the data stored within its memory, rendering a new amount for future use. The answerback signal generated by the transponder device would indicate to the base station means that the transaction had been completed and that an adequate amount of "toll money" had been stored in the form of data within the internal changeable memory means of the transponder.

Quite importantly, the transponder device of the instant invention requires no internal power source to operate and this feature in and of itself affords a distinctive advantage as well as a distinguishing characteristic over the prior-art. Specifically, in the preferred inventive embodiment, the novel transponder means of the instant invention is contemplated to utilize the power contained within the interrogation signal itself as the operating power for the device and thus, the transponder means of the instant invention is passive and entirely self-contained.

From a structural standpoint, the novel transponder device of the instant invention is surprisingly simple and requires but a minimum number of standard electronic components interconnected in a novel fashion. For example, a receiving apparatus would be provided, such receiving apparatus having modifications made thereto enabling power to be taken from the interrogation signal to operate the transponder. Interrogation signals, once received, would be de-coded and fed through internal logic circuitry means wherein, in accordance with a preselected logic format, the internal memory storage means of the transponder would either have data written into or read out therefrom. Finally, the transponder device would be provided with a transmitter so as to transmit back to the base station an answerback signal representative of the data read-out from the internal memory storage means.

With the availability of a multitude of different micro-electronic components, the entire transponder device can be miniaturized into the size of a credit card, for example, by utilizing integrated circuit techniques and orthoferrite memory cores. By so miniaturizing, the scope of utilization of the transponder device is greatly increased, and by the same token, its power requirements are less.

BRIEF DESCRIPTION OF THE INVENTION

The invention itself will be better understood and further advantageous features thereof will become apparent from the following detailed description of a preferred embodiment, such description making reference to the appended sheet of drawings wherein:

FIG. 1 is an electrical schematic illustration of a transceiver device representing a base station means;

FIG. 2 is an electrical circuit-schematic of a transponder device itself constructed in accordance with the novel invention; and FIG. 3 is a more detailed schematic diagram of components of the device of FIG. 2.

DETAILED DESCRIPTION OF A PREFERRED INVENTIVE EMBODIMENT

Referring now to the drawings, the single sheet thereof depicts the novel transponder device of the instant invention in an interrogation system environment.

Specifically, a base station means is provided as shown in FIG. 1 and preferably comprises a transceiver 10 with an associated transmitting and receiving antenna 12. Transceiver 10 initially serves to generate and transmit an interrogation signal which, in this preferred inventive embodiment, comprises a radio frequency carrier $F_1$ modulated in accordance with predetermined codes as will be discussed hereinbelow. As should be appreciated, however, the actual signal transmitted as well as received by the base station means 10 may be optical, and/or acoustic rather than rf as discussed herein.

The transponder device of the instant invention is illustrated in FIG. 2 and, when the transponder device is in relatively close proximity to the base station comprising the transceiver 10, the receiving antenna 14 of the transponder device would intercept the interrogation signal from the transceiver 10 at the above-mentioned frequency $F_1$. The intercepted interrogation signal would then be conducted along a coaxial connecting cable 16 to a tuning circuit 18 comprising transformer 20 and variable capacitor 22, this tuning circuit selecting the modulated signal $F_1$ and rejecting all others. The signal then passes to a receiver unit 24 wherein the modulations of the carrier $F_1$ comprising the interrogation signal are detected, amplified and shaped in known fashion.

The detected interrogation signal then passes to a decoder and logic circuit means 26 wherein the modulation code is detected in accordance with preselected internal logic. Specifically, the interrogation signal modulations are contemplated to define a code to either selectively read data out from or write data into an internal changeable memory storage means 28 which, in the preferred inventive embodiment could comprise orthoferric cores or the like. If the detected code of the interrogation signal called for a write operation, then data information carried on the interrogation signal would, under the control of the decoder and logic means 26, pass into a write amplifier means 30 for transfer into the changeable memory storage means 28. Similarly, if the detected code of the interrogation signal called for a read operation, then the read amplifier means 32 would be actuated causing data stored in the memory storage means 28 to be read out therefrom. Data read out from the memory storage means 28 either is transferred to a transmitter means 34 along schematically illustrated cable 36 with subsequent retransmission as an "answerback" signal on transmitting antenna 38 at a second carrier frequency $F_2$, or such data may be transferred back into the write amplifier 30 by means of schematically illustrated cable 40. In this latter instance, a closed loop exists from the memory storage means 28 through the read amplifier 32 into the write amplifier 30 wherein the data information would be updated or modified in accordance with the output from the decoder and logic means 26 and particularly the preselected logic therein, and transferred once again into the memory storage means 28 for subsequent use.

As should be appreciated, a significant advantage of the instant transponder device resides in the fact that the internal memory storage means 28 comprises a changeable memory in which the data stored therein can be updated or modified as desired, all under the control of the interrogation signal transmitted by the transceiver means 10 at the base station of FIG. 1.

Referring now to FIG. 3, there is illustrated therein a more detailed electrical schematic diagram of certain components such as the decoder and logic means 26 of the transponder device above-discussed with respect to FIG. 2. As will be seen, the decoder and logic means 26 comprises a data detector 60, a timing detector 62 and a combination function detector and gate 64 in accordance with a preferred construction. The output from receiver 24 may, as above described, contain a coded command signal, new data, as well as timing information. This signal passes to the decoder and logic means 26 and specifically to the data detector and timing detector sections 60 and 62 thereof. Numerous linear integrated circuits can be utilized for the timing and data detector such as manufactured by Texas Instruments, RCA, Sprague and the like. Timing detector 62 provides clock pulses necessary for operation of the logic functions and the core drive for the memory.

The output from the data detector 60 passes to a function detector-gate 64 which element determines what function code is presented and serves to set the proper internal gates. Function detector 64 may comprise serial or parallel shift registers including AND gates for selecting the proper codes. As a function of the received code, the function detector-gate 64 will connect the write or read amplifiers 30 and 32, respectively, to effect a write-in, read-out or read-write-in operation. Simultaneously, the function detector and gate 64 would serve to set address shift register 66 to the proper starting point. These shift registers would then shift through all the desired memory core addresses in accordance with timing pulses from the timing detector 62. The address drive amplifier 68 would drive the various wires of the memory storage means 28 and specifically the core plane thereof with the desired "partial select" currents as is known in the art.

Each of the individual functional components may all be constructed with currently available production devices such as transistor-transistor logic packages or discrete semi-conductor devices. The memory storage means 28 utilized in the preferred inventive embodiment can be constructed of square loop ferrite core memory planes which are also currently available in many sizes from various manufacturers, as should be apparent to those skilled in the art.

A particularly advantageous feature of the instant invention concerns the novel manner in which operating power therefor is generated. Rather than requiring an internal source of supply, operating power for the transponder unit of FIG. 2 is actually produced from the interrogation signal transmitted by the base station transceiver means 10. In this respect, it should be noted that an additional, high-Q tuning circuit 42 is coupled to the receiving antenna of the transponder, tuning circuit 42 comprising transformer 44 as well as variable capacitor 46. Tuning circuit 42 is a highly selective band-pass filter and serves to detect only the carrier frequency $F_1$ of the transmitted interrogation signal. The detected carrier frequency is then integrated by means of diode 48 and storage capacitor 50 whereby a DC power output can be taken from terminal P. This power output then is applied to each of the remaining elements of the transponder device through connections $P_1$ through $P_5$. Since the transponder unit of the instant invention requires the interrogation signal from the base station means to be continuously present so that operating power is available, the "answerback" signal transmitted by the transponder device transmitter 52 is contemplated to be centered around a different carrier frequency $F_2$, as described above, so that interference between the interrogation signal and the "answerback" signal, which signals are generated substantially concurrently in time, does not take place.

As briefly mentioned, at the outset to the specification, the novel construction as above described, produces a transponder device which has widespread utility in many different environments, since the transponder device need not provide its own operating power and since the internal memory storage of the transponder device is changeable in accordance with predetermined logic as selected by the coded interrogation signal transmitted thereto. As one non-limiting and illustrative example of the utility of this system, its application as an automatic highway toll device for motor vehicles will be described.

Initially, let it be assumed that the transponder device of FIG. 2 is mounted upon a motor vehicle traversing a toll highway having various toll stations at each of which a base station means comprising a transceiver 10 would be provided, such as shown in FIG. 1. The memory storage means 28 of the transponder unit upon the vehicle would have data stored therein representative of a set dollar amount X of pre-paid tolls. Further, let it be assumed that the cost or toll at each base station means or toll booth is Y dollars.

Now, as the vehicle passes in proximity to the transceiver 10 comprising the base station means, an interrogation signal would be transmitted thereto. This interrogation signal would have encoded thereon the amount of the toll that is due, i.e., Y dollars. The carrier frequency $F_1$ of the interrogation signal would be detected by the tuning circuit 42 of the transponder unit, and this detected carrier signal would provide the operating power for the transponder unit. The modulated coded portion of the interrogation signal would be received, and detected and then passed into the decoder and logic means 26 of the transponder unit.

Here, by virtue of the coding of the signal, the transponder unit would read the stored toll amount in the memory storage means 28, i.e., X dollars, into the read amplifier 32, this read out stored amount then being passed into writing amplifier 30 wherein the stored amount X would have the present toll amount Y subtracted therefrom and the remainder amount re-written by the write amplifier means 30 into the memory storage means 28. Upon completion of this transaction, an "answerback" signal would be transmitted by the transmitter means 52 to the base station means comprising transceiver 10 over a carrier frequency $F_2$.

As the vehicle upon which the transponder device is mounted passes by further toll stations, this process would be successively repeated until the total dollar amount of pre-paid tolls stored in the memory storage means 28 of the transponder unit was exhausted. At that time, additional base station means could be provided to write into the memory storage means 28 of the transponder unit a credit amount X' of pre-paid tolls and the process would proceed.

As should be apparent, other utilizations of the novel interrogation-transponder system can be implemented and various logic formats, codings, and the like can be used at will to achieve virtually any function. In this respect, the transponder device of the instant invention truly comprises a general purpose, programmable unit rather than a fixed, single-utility unit as has been characteristic of prior-art devices. Again, the particular form of interrogation and answerback signal is not critical to the instant invention as any form of energy which can be transmitted can be utilized.

Through the provision of the inventive interrogation system and transponder device as described above, it is evident that all of the objects set forth at the outset of the specification have been successfully fulfilled.

What is claimed is:

1. A transponder comprising:
   memory means for storing date;
   means responsive to a transmitted code signal for selectively writing data into or reading data out from said memory means, and for transmitting as an answerback signal data read-out from said memory means; and
   means for internally generating operating power for said transponder from said transmitted code signal, whereby said transponder is self-contained.

2. A transponder as defined in claim 1, wherein the transmitted code signal comprises a modulated carrier wave, said means for generating operating power comprising detecting means for detecting said carrier wave and producing an operating power output signal therefrom, and means responsive to said operating power output signal for powering said transponder, and wherein said modulations of said carrier wave contain data and command information.

3. A transponder as defined in claim 2, wherein said carrier wave is of radio frequency.

4. A transponder as defined in claim 2, wherein said carrier wave is of light frequency.

5. A transponder as defined in claim 2, wherein said carrier wave is of acoustic frequency.

6. A transponder as defined in claim 2, wherein said means responsive to the transmitted code signal detects the modulations thereof and operates to transmit said answerback signal in accordance with pre-selected logic data stored in said memory means.

7. An interrogation system comprising:
   base station means for transmitting an interrogation signal; and
   remote station means, said remote station means including a receiver means for receiving said interrogation signal, a memory means, means for processing said signal in accordance with predetermined logic to selectively write data into and read data out from said memory means, and transmitter means for transmitting an answerback signal to said base station means; and
   said remote station means further includes means for generating operating power from said received interrogation signal, whereby said remote station means is self-contained.

* * * * *